US012705667B2

(12) United States Patent
Lin et al.

(10) Patent No.: US 12,705,667 B2
(45) Date of Patent: Aug. 11, 2026

(54) SELECTING ITEM ATTRIBUTES TO DISPLAY IN A LIMITED SCREEN AREA OF A USER INTERFACE BASED ON PREDICTED ENGAGEMENT FROM A MACHINE LEARNING MODEL

(71) Applicant: Maplebear Inc., San Francisco, CA (US)

(72) Inventors: Shih-Ting Lin, Santa Clara, CA (US); Saurav Manchanda, Seattle, WA (US); Prithvishankar Srinivasan, Seattle, WA (US); Amirali Darvishzadeh, San Jose, CA (US); Min Xie, Santa Clara, CA (US); Shishir Kumar Prasad, Fremont, CA (US); Danna Weintraub, New York, NY (US); Satish Boggarapu, Media, PA (US)

(73) Assignee: Maplebear Inc., San Francisco, CA (US)

( * ) Notice: Subject to any disclaimer, the term of this patent is extended or adjusted under 35 U.S.C. 154(b) by 288 days.

(21) Appl. No.: 18/416,823

(22) Filed: Jan. 18, 2024

(65) Prior Publication Data

US 2025/0238854 A1 Jul. 24, 2025

(51) Int. Cl.
*G06Q 30/00* (2023.01)
*G06N 3/084* (2023.01)
*G06Q 30/0601* (2023.01)

(52) U.S. Cl.
CPC ......... *G06Q 30/0641* (2013.01); *G06N 3/084* (2013.01)

(58) Field of Classification Search
CPC ................................................ G06Q 30/0641
See application file for complete search history.

(56) References Cited

U.S. PATENT DOCUMENTS 8,260,771 B1 * 9/2012 Ortega ................ G06F 16/9032 707/723
10,861,077 B1 * 12/2020 Liu ........................ G06Q 30/06
11,494,686 B1 * 11/2022 Mandayam Comar ...................... G06N 20/00

(Continued)

OTHER PUBLICATIONS

Banhawi, Firdaus, and Nazlena Mohamad Ali. "Measuring user engagement attributes in social networking application." 2011 International Conference on Semantic Technology and Information Retrieval. IEEE, 2011.*

*Primary Examiner* — Kathleen Palavecino
(74) *Attorney, Agent, or Firm* — Fenwick & West LLP

(57) ABSTRACT

An online concierge system maintains various attributes for each item. To optimize information about items displayed in an interface, the online concierge system selects a subset of attributes of an item for display based on an item category including the item. The online concierge system applies an attribute selection model to combinations of an item category and attributes associated with the item category. The attribute selection model selects one or more attributes for an item category using one or more of an engagement model trained from prior interactions by customers and an output of a large language model prompted to select relevant attributes based on the item category. When generating an interface including an item, the online concierge system includes the subset of attributes selected for an item category including the item in conjunction with the item.

19 Claims, 5 Drawing Sheets

(56) References Cited

U.S. PATENT DOCUMENTS

| | | | | |
|---|---|---|---|---|
| 12,019,663 | B1 * | 6/2024 | Zhang | G06F 16/3344 |
| 2025/0245246 | A1 * | 7/2025 | Fang | G06F 16/287 |

* cited by examiner

SELECTING ITEM ATTRIBUTES TO DISPLAY IN A LIMITED SCREEN AREA OF A USER INTERFACE BASED ON PREDICTED ENGAGEMENT FROM A MACHINE LEARNING MODEL

BACKGROUND

Online concierge systems receive orders from customers for items offered by retailers. To fulfill an order from a customer, an online concierge system allocates the order to the picker, who obtains items in an order from a retailer. The picker delivers the obtained items to the customer to fulfill the order. Because a customer selects items for an order from a retailer, the online concierge system displays one or more interfaces to a customer identifying items available by the retailer, with the customer selecting items for inclusion in an order from one or more of the interfaces.

Additionally, an online concierge system maintains various attributes for each item offered by a retailer. An attribute of an item includes information describing the item. Example attributes of an item include organic, packaged, low-fat, vegan, or other descriptive information about the item. When the online concierge system displays items to a customer through an interface, one or more attributes may be displayed in conjunction with each item. Displaying an attribute in conjunction with an item allows a customer to ascertain information about the item through the interface for evaluating whether to include the item in an order.

However, an interface displayed by the online concierge system to customers has limited display area for presenting items and attributes of the items. This limited display area constrains a number of attributes of an item in conjunction with the item by the interface. While limiting a number of attributes of an item displayed in an interface accommodates the limited display area for an item, this reduces information about items displayed available to the user via the interface. Conversely, displaying multiple attributes of an item in the interface may present a customer with excessive information about items, impairing the customer's navigation through the interface or evaluation of different items. While heuristically selecting certain attributes of an item to display in conjunction with the item allows display of a specific number of attributes for display in conjunction with an item, different attributes have different relevance to different customers when evaluating items. Different attributes of items may have different relevance to customers based on an item category including the items, which is not effectively accounted for by conventional heuristic selection of attributes for display.

SUMMARY

In accordance with one or more aspects of the disclosure, an online concierge system maintains items offered by various retailers and associates various attributes with each item. An attribute of an item provides descriptive information about the item to customers of the online concierge system. Each attribute of an item has a corresponding value. For example, an attribute of "organic" has a specific value if an item is organic and has a different value if the item is not organic.

Additionally, the online concierge system maintains item categories, with an item category including a set of items having a similar type or having a threshold amount of common attributes. Items in an item category may be considered to be equivalent to each other or may be replacements for each other in an order. The item categories may be human-generated and human-populated with items or may be generated automatically by the online concierge system (e.g., using a clustering algorithm).

The online concierge system displays one or more interfaces to customers in response to a request from the customer. An interface displays one or more items retrieved by the online concierge system in response to the request. For example, the request is a request to create an order identifying a retailer, and an interface displays a set of items available by the retailer. As another example, a request is a search query, with an interface displaying search results based on the search query generated in response to the request. In various embodiments, the online concierge system displays different interfaces for different item categories of items offered by the retailer, simplifying selection of items offered by the retailer for inclusion in an order.

To provide additional information about an item displayed by an interface, the online concierge system displays one or more attributes of the item in conjunction with the item in the interface. As the interface has limited display area for different items, displaying a large number of attributes in conjunction with an item makes the interface more cumbersome and more difficult to navigate for customers. Further, displaying a large number of attributes of various items may provide a customer with excessive information about an item that complicates the customer's review of displayed items. To account for a limited display area of the interface for displaying attributes of items, the online concierge system displays a specific number of attributes in conjunction with each item in an interface. For example, the interface displays a single attribute in conjunction with each item.

To optimize information about an item displayed in conjunction with the item in a display area of an interface, the online concierge system selects an attribute, or a subset of attributes, for an item based on an item category including the item. The online concierge system selects the subset of attributes for an item category by applying an attribute selection model to the attributes associated with the item category. Based on the output of the attribute selection model, the online concierge system selects the subset of attributes associated with the item category.

In some embodiments, the attribute selection model is an engagement model that evaluates likelihoods of a customer engaging with one or more items from the item category when different attributes are displayed in conjunction with items from the item category. As different attributes of an item provide different levels of information about the item to customers viewing the interface, selecting the subset of attributes for an item category based on likelihoods of customers engaging with items when different attributes are displayed optimizes an amount of information about items presented to customers by the interface. To select a subset of attributes for an item category, the online concierge system trains an attribute selection model to determine scores for different attributes of an item to a customer based in part on a likelihood of the customer performing a specific action (e.g., selecting) an item when different attributes are displayed in conjunction with the item. Accounting for the likelihood of the customer performing the specific action with an item when selecting an attribute for display allows the online concierge system to account for different effects of different attributes on user interaction with the online concierge system.

The online concierge system applies the attribute selection model comprising the engagement model to multiple combinations of an attribute and an item category. Applying the engagement model to a combination of attribute and item category generates an engagement score for the attribute that indicates a probability of a customer performing the specific action with an item when the attribute is displayed in conjunction with the item. Based on the engagement scores, the online concierge system selects the subset of attributes. For example, the online concierge system ranks attributes associated with the item category based on their engagement scores and selects a subset of attributes having at least a threshold position in the ranking.

To train the engagement model, the online concierge system obtains a training dataset based on prior interactions by one or more customers with the online concierge system. In some embodiments, the training dataset includes historical interactions by a specific customer with the online concierge system. Alternatively, the training dataset includes historical interactions by multiple customers with the online concierge system. From the training dataset, the online concierge system generates training examples. Each training example includes a training item category and a value of the training attribute, with a label applied to a training example indicating whether a specific action with at least one item in the training item category having the value of the training attribute in the training example for the attribute was performed. For example, the label indicates whether at least one item included in the training item category having the value for the training attribute was previously included in an order in the historical interactions. For example, the label indicates a rate (or a frequency) at which the specific action was performed with one or more items in the training item category and having the value of the training attribute included in the training example based on the historical interaction. From the training examples, the online concierge system trains the engagement model through backpropagation to output a probability of a customer performing the specific action based on an item category and a value of an attribute of the item. Hence, the engagement score comprises the probability of a customer performing the specific action based on the item category and a value of an attribute of the item. In some embodiments, the engagement model also receives an identifier or a description of an attribute of an item in conjunction with the item category and a value of the attribute.

Alternatively, the engagement model comprises a large language model (LLM) previously trained on a text corpus to output text in response to a text prompt from a user. In various embodiments, the LLM is a generative pre-trained transformer model (GPT). The online concierge system generates a prompt for the LLM identifying an item category, descriptive information of each attribute included in the item category, a request to select a specific number of attributes from the prompt relevant to a customer, and one or more criteria for selecting the specific number of attributes. In some embodiments, the prompt also includes one or more characteristics of the customer to tailor selection of the attributes by the LLM to a specific customer. Hence, the LLM outputs a set of attributes including the specific number of attributes included in the prompt that the LLM determines are likely important to customers or determines satisfies one or more criteria included in the prompt. The online concierge system selects the subset of attributes for the item category as the attributes output by the LLM based on the prompt.

In various embodiments, the attribute selection model includes both the engagement model and the LLM. The engagement selection model generates an engagement score for a combination of the item category and the attribute, as further described above. Additionally, the attribute selection model determines a relevance score of the attribute determined from a large language model (LLM). In various embodiments, the attribute selection model generates a score for an attribute as a combination of the engagement score from the engagement model for the combination of the item category and the attribute and the relevance score for the combination of the item category and the attribute. Including the LLM in the attribute selection model with the engagement model mitigates potential noise or bias in the training dataset used to train the engagement model by augmenting the engagement score with the relevance score of an attribute for an item based on the output of the LLM.

In various embodiments, the attribute selection model determines a relevance score for an attribute by comparing the attribute to the set of attributes output by the LLM. In response to an attribute being included in the set of attributes output by the LLM, the attribute selection model assigns a specific value to a relevance score for the attribute, while the attribute selection model assigns an alternative value to the relevance score for the attribute in response to the attribute not being included in the set of attributes output by the LLM. The value for the relevance score when an attribute is not included in the set of attributes output by the LLM is less than the value of the relevance score with the attribute is included in the set of attributes output by the LLM in various embodiments. For example, a relevance score of an attribute included in the set of attributes output by the LLM is one, while the relevance score of an attribute that is not included in the set of attributes output by the LLM is zero.

The attribute selection model including the engagement model and the LLM determines a score for an attribute by combining an engagement score for the attribute and a relevance score for the attribute. For example, the score for an attribute is a combination of the engagement score for the attribute and the relevance score for the attribute. In various embodiments, when applied to an attribute, the attribute selection model applies the engagement model to each combination of the item category a value of the attribute, generating a set of engagement scores. Each engagement score of the set corresponds to a different value of the attribute. In various embodiments, the attribute selection model selects a maximum engagement score of the set of engagement scores as the engagement score for the attribute. Alternatively, the attribute selection model derives an engagement score from the set of engagement scores. For example, the attribute selection model determines the engagement score for an attribute as a difference between a maximum engagement score from the set of engagement scores and a minimum engagement score from the set of engagement scores. In other embodiments, the attribute selection model determines an engagement score for an attribute using another function applied to the set of engagement scores, with the attribute selection model combining the engagement score for the attribute and the relevance score for the attribute.

To select an attribute of an item to display in an interface, the online concierge system determines an item category including the item and retrieves a group of attributes of items included in the item category. This obtains a set of potential attributes for the item based on the item category including the item. In some embodiments, the online concierge system stores the group of attributes in association with an item category, simplifying retrieval of the group of attributes associated with the item category including an item.

For an item, the online concierge system applies the attribute selection model to each combination of an item category including the item and each attribute in the group of attributes associated with the item category, resulting in a set of scores. Each score corresponds to an attribute of the group of attributes associated with the item category. Based on the scores for each attribute of the group from the attribute selection model, the online concierge system selects a subset of attributes for display in conjunction with items included in the item category. For example, the online concierge system ranks attributes based on their corresponding scores so attributes with larger scores have higher positions in the ranking. The online concierge system selects attributes having at least a threshold position in the ranking for display in conjunction with an item included in the item category. For example, the online concierge system selects an attribute having a highest position in the ranking for display in conjunction with the item included in the item category. The subset of items displayed in conjunction with the item may include a different number of attributes in different embodiments. In some embodiments, the subset includes a single attribute, while in other embodiments the subset includes two attributes. However, any number of attributes may be included in the subset for display in various embodiments.

After selecting the subset of attributes for an item category based on the scores for different combinations of the item category and attributes of the group associated with the item category, the online concierge system generates the interface for display to the customer. In some embodiments, the online concierge system generates the interface after selecting the subset of attributes for each item category including at least one item to be displayed in the interface. The interface displays an item and the subset of attributes selected for an item category including the item in conjunction with the item. In various embodiments, the interface displays a corresponding subset of attributes in conjunction with each item displayed by the interface. Text corresponding to a selected attribute may be displayed in conjunction with an item or an icon or image corresponding to a selected attribute may be displayed in conjunction with the item in various embodiments. This allows the online concierge system to select one or more attributes of each item displayed in the interface based on corresponding item categories including the items of the interface, so attributes displayed in conjunction with an item are attributes determined to be most relevant to a likelihood of the customer engaging with an item, such as performing a specific action with the item. For example, attributes displayed in conjunction with an item are attributes most likely to affect whether the customer includes an item in an order.

DETAILED DESCRIPTION

Figure 1:
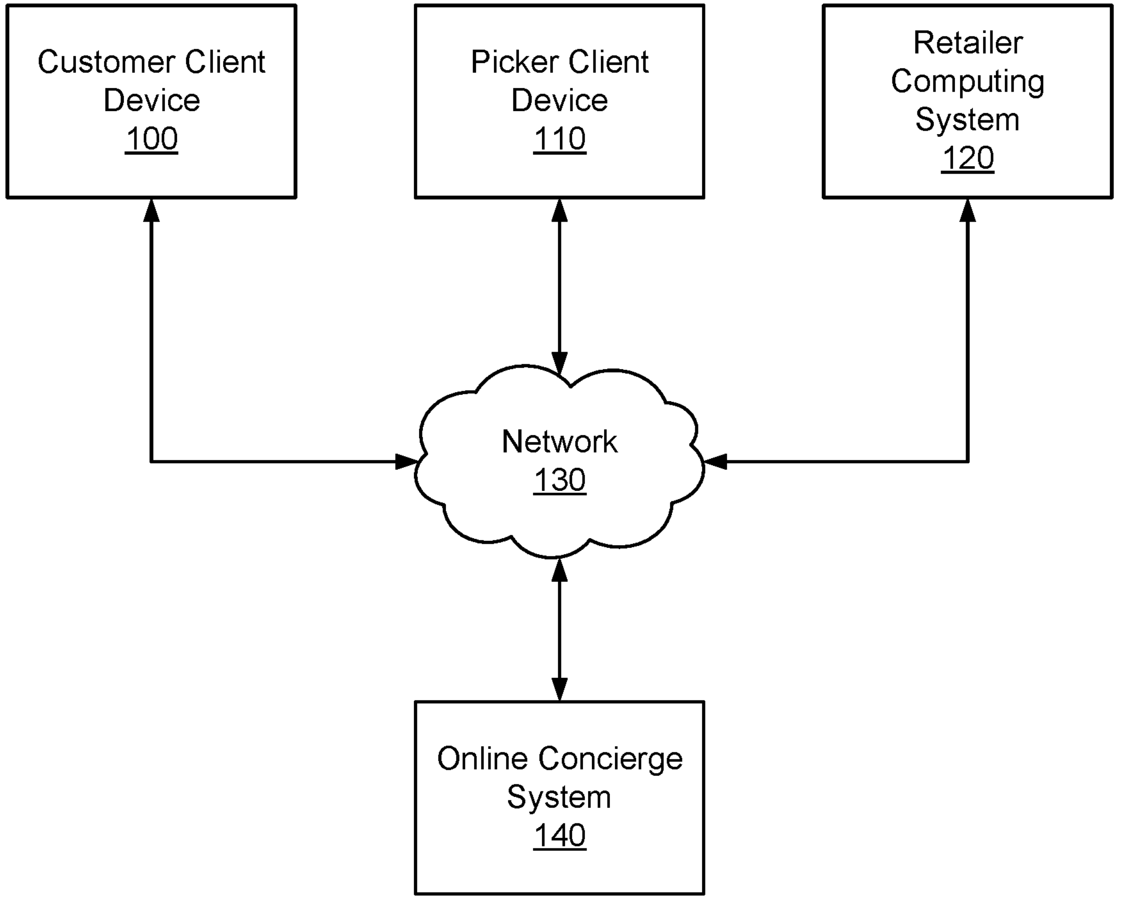
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
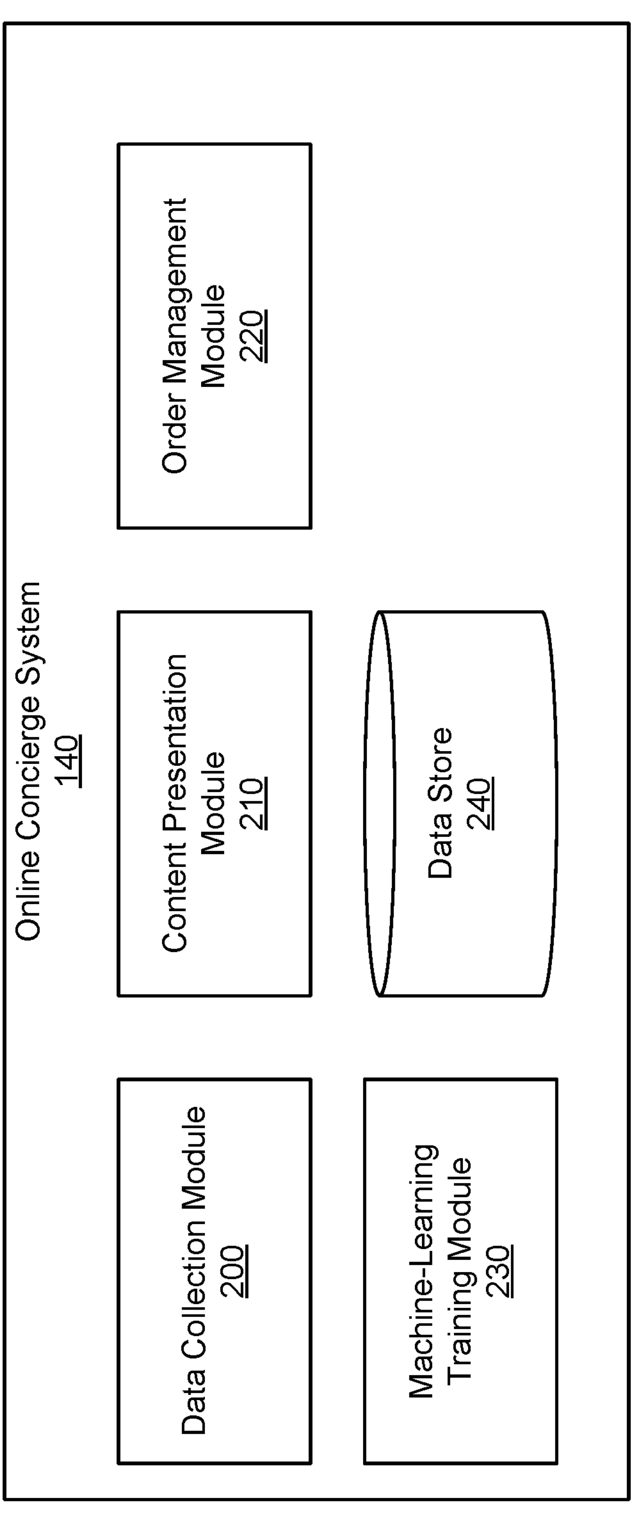
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 generates one or more interfaces that display content to a customer. For example, an interface displays various items to a user, while another information displays a single item and attributes of the item. The content presentation module 210 receives a request for an interface from a customer client device 100 and generates an interface in response to the request. When generating the interface, the content presentation module 210 determines a context for the interface from the request. The context describes a format in which content is to be displayed in the interface, and is determined from data in the request for the interface. Example contexts for an interface include search results, a listing of items having an attribute (e.g., in a category, offered by a retailer) specified by the request, a recipe identified by the request, or other format for display of items.

To improve interaction by a customer with a generated interface, the content presentation module 210 applies an attribute selection model to item categories associated with various retrieved items for display in an interface, as further described below in conjunction with FIGS. 3 and 4. Based on the attribute selection model, the content selection module 210 selects a subset of attributes for an item category, with the subset of attributes displayed by an interface in conjunction with an item included in the item category. In some embodiments, the attribute selection model receives a combination of an item category and an attribute of an item, and outputs a score representing an influence of the attribute of the item on a customer performing a specific action with an item included in the item category. For example, the score for an attribute provides a measure of an effect of the attribute on the customer including an item from the item category in an order. For each item to be displayed in an interface, the content selection module 210 applies the attribute selection model to each combination of a corresponding item category for the item and a group of attributes associated with the item category, generating a score for each attribute of the group of attributes associated with the item category. From the scores for each attribute of the group of attributes associated with the item category, the content presentation module 210 selects a subset of attributes for display in conjunction with one or more items included in the item category. In other embodiments, the attribute selection model comprises a large language model (LLM) that outputs a specific number of attributes based on a received prompt identifying an item category, with the attributes output by the LLM selected as the subset of attributes for display in conjunction with items having the item category. Selection of attributes using an attribute selection model is further described below in conjunction with FIGS. 3-5. In some embodiments, the subset of attributes comprises a single attribute, while in other embodiments, the subset of attributes includes multiple attributes The content presentation module 210 displays the selected subset of attributes for an item category in conjunction with an item included in the item category, allowing the content presentation module 210 to generate one or more interfaces displaying attributes of items most likely to have an effect on the a customer performing a specific action with an item (e.g., including the item in an order) in conjunction with each item. This allows the content presentation module 210 to optimally display attributes of items in limited display areas for various items to provide customers with one or more attributes most relevant to a customer determining whether to perform a specific action with items.

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

As further described below in conjunction with FIGS. 3 and 4, the machine learning training module 230 trains an attribute selection model for selecting a subset of attributes from an item category. In some embodiments, the attribute selection model determines a score for a combination of an item category for an item and an attribute of the item. In various embodiments, the attribute selection model is an engagement prediction model generating an engagement score based on a probability of a user performing a specific action with an item when an attribute is displayed in conjunction with the item based on a combination of the attribute and an item category including the item. The machine learning training module 230 trains the engagement model by obtaining a training dataset from the data collection module 200 describing prior interactions by one or more users with the online concierge system 140. For example, the training dataset includes prior instances of a user performing a specific action with one or more items, such as including an item in an order for fulfillment by the online concierge system 140. The training dataset includes multiple training examples that each include a combination of a training item category and a value of a training attribute for an item. In some embodiments, a training example also includes an identifier or a description of the training attribute. From indications of performance of the specific action by the customer, or by one or more customers, with items included in the training item category and having the value for the training attribute stored by the data collection module 200, the machine learning training module 230 generates a label for a training example including a combination of the training item category and a value of training attribute (and optionally a description of the training attribute), as further described below in conjunction with FIG. 3. In various embodiments, the generated label is a rate at which the customer, or one or more customers, performed the specific action with items included in the training item category and having the value of the training attribute during a time interval. For example, the generated label is a frequency with which the customer, or one or more customers, included one or more items in the training item category having the value of the training attribute in an order during the time interval. Through a backpropagation process, further described below in conjunction with FIG. 3, the machine learning training module 230 trains the engagement model through application to multiple training examples. After training, the engagement model outputs an engagement score comprising a probability of a customer performing the specific action with one or more items from an item category having a value of an attribute, as further described below in conjunction with FIG. 3.

In other embodiments, the attribute selection model is a large language model (LLM) that receives a prompt comprising text input and generates output text based on the received prompt. In various embodiments, the LLM is a generative model previously trained on a text corpus to output text data in response to a received prompt. For example, the LLM is a generative pre-trained transformer (GPT) model. In various embodiments, the machine learning training model 230 generates supplemental examples including examples of outputs for the LLM in response to various prompts. In various embodiments, a supplemental example includes output text. A prompt to the LLM may include a supplemental example, or an embedding of the supplemental example, in various embodiments, allowing the LLM to leverage the supplemental example included in the prompt when generating output text. As further described below in conjunction with FIGS. 3 and 4, the LLM receives a prompt identifying an item category, descriptive information of each attribute in a group associated with the item category, a request to select a specific number of attributes from the group, and one or more criteria for selecting the specific number of attributes (e.g., attributes relevant to a customer). In some embodiments, the prompt also includes one or more characteristics of the customer to tailor selection of the attributes to a specific customer. Hence, the LLM outputs a set of attributes including the specific number of attributes specified by the prompt that the LLM determines are likely relevant to customers, or relevant to a customer with characteristics included in the prompt. The attributes output by the LLM are the subset of attributes for display in conjunction with items included in an item category in various embodiments.

Alternatively the attribute selection model includes the engagement model and the LLM, with the attribute selection model determining a score for an attribute and an item category based on an engagement score output by the engagement prediction model and a relevance score based on output of the LLM. As further described below in conjunction with FIGS. 3 and 4, the attribute selection model generates a score for an attribute based on an engagement score output by the engagement model and the set of attributes output by the LLM. For example, the attribute selection model combines the engagement score from the engagement model for an item category and an attribute and a relevance score determined by comparing the attribute to the set of attributes output by the LLM to determine the score for the attribute. As further described below in conjunction with FIG. 3, the relevance score has a particular value when the attribute is included in the set of attributes output by the LLM and has an alternative value when the attribute is not included in the set of attributes output by the LLM. One or more attributes of an item are selected for display based on the scores for the attributes, as further described below in conjunction with FIGS. 3-5.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
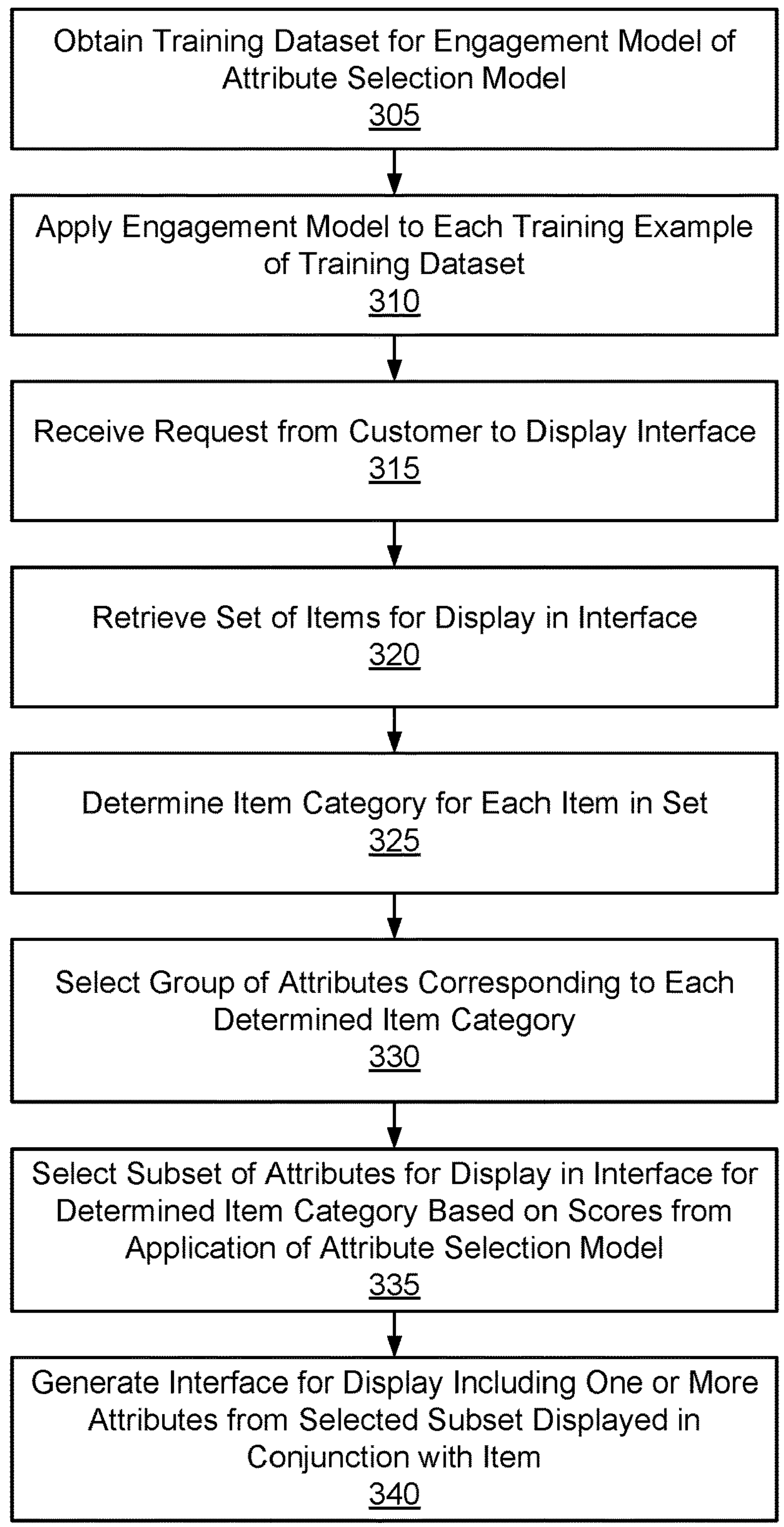
FIG. 3 is a flowchart of a method for selecting an attribute of an item for display in an interface presented to a customer of an online concierge system, in accordance with one or more embodiments.

FIG. 3 is a flowchart of a method for selecting an attribute of an item for display in an interface presented to a customer of an online concierge system 140, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

As further described above in conjunction with FIG. 2, the online concierge system 140 maintains item data for items offered by a retailer or a retail location. The item data includes an item identifier of an item and one or more attributes of the item. Example attributes of an item include size, color, weight, packaging, nutritional information, ingredients of the item, dietary constraints satisfied by the item, or other information describing the item. Different attributes may be maintained for different items. Each attribute has a corresponding value based on an item, so different attributes of an item provide different information about the item. Also, online concierge system 140 maintains item categories, with an item category including a set of items having a similar type or having a threshold amount of common attributes. Items in an item category may be considered to be equivalent to each other or may be replacements for each other in an order. The item categories may be human-generated and human-populated with items or may be generated automatically by the online concierge system (e.g., using a clustering algorithm). The online concierge system 140 stores an association between each item and a corresponding item category in various embodiments.

Additionally, the online concierge system 140 displays one or more interfaces to a customer including one or more items. However, various interfaces displayed by the online concierge system 140 have limited display area for items. While displaying attributes of items in conjunction with items in an interface simplifies customers obtaining information about items, interfaces have limited display area for different items. Having limited display area for information about items in an interface causes display of a large number of attributes about items makes the interface more cumbersome for a customer to navigate. Additionally, displaying a large number of attributes of items in an interface increases a difficulty of the customer reviewing attributes of an item to evaluate whether to include the item in an order or to perform another action with the item. Further, different customers differently emphasize different attributes of items, so limiting display of attributes of an item in an interface may prevent a customer from easily determining whether to perform a specific action with an item based on attributes of the item displayed in an interface by withholding display of one or more attributes of the item most likely to influence the customer's actions.

To optimize information about an item in a display area of an interface for the item, the online concierge system 140 trains an attribute selection model for selecting a subset of attributes for an item category to display in an interface in conjunction with an item included in the item category. In various embodiments, the attribute selection model includes one or more of an engagement model and a large language model (LLM). In some embodiments, the attribute selection model is an engagement model, while in other embodiments the attribute selection model is the LLM. Alternatively, the attribute selection model includes the engagement model and the LLM, with the attribute selection model determining a score for an attribute based on output of the engagement model and output of the LLM. Based on application of the attribute selection model to attributes of the group, the online concierge system 140 selects a subset of attributes for an item category. This allows the online concierge system 140 to optimally display a specific number of attributes in conjunction with each item in an interface based on item categories including different items. For example, the interface displays a single attribute in conjunction with each item determined based on application of the attribute selection model to various attributes associated with an item category including an item.

The engagement model comprising the attribute selection model, or included in the attribute selection model, determines an engagement score for an attribute indicating a probability of a customer performing a specific action with an item based on the attribute. To train the engagement model, the online concierge system 140 obtains 305 a training dataset for the engagement model based on historical interactions with the online concierge system 140 by one or more customers. The training dataset includes multiple training examples based on performance of a specific action by a customer or by one or more customers. In some embodiments, the training dataset is based on interactions by a specific customer with the online concierge system 140 over time, while in other embodiments, the training dataset is based on interactions by multiple customers with the online concierge system 140 by over time.

Each training example of the training dataset includes a training item category and a value of a training attribute associated with the training item category. In some embodiments, a training example also includes a description of the training attribute, such as a name of the training attribute or other information identifying the training attribute. The online concierge system 140 applies a label to a training example indicating a frequency with which one or more customers performed a specific action with one or more items included in the training item category of the training example and having the value of the training attribute included in the training example. For example, the label is a frequency or a rate at which a customer performed a specific action with one or more items included in the training item category and having the value included in the training example for the training attribute identified by the training example during a time interval. In an example, the label of a training example identifies a frequency with which a customer includes one or more items in the training item category of the training example and having the value included in the training example for the training attribute identified by the training example in orders.

After obtaining 305 the training dataset, the online concierge system 140 trains the engagement model by applying 310 the engagement model to each training example of the training dataset. The engagement model outputs an engagement score comprising a probability of one or more customers performing a specific action with one or more items included in a received item category and having a received value for an attribute associated with the item category. In various embodiments, the engagement model receives a combination of an item category and a value of an attribute as an input and outputs an engagement score comprising a probability of one or more customers performing a specific action with one or more items in the item category and having the value of the attribute. An identifier of an attribute, such as name of an attribute, may be received by the engagement model in conjunction with the item category and value of the attribute in some embodiments.

The engagement model comprises a set of weights stored on a non-transitory computer readable storage medium in various embodiments. For training, the online concierge system 140 initializes a network of a plurality of layers comprising the engagement model, with each layer including one or more weights. As described above, the engagement model receives a combination of an item category and a value of an attribute (and may receive an identifier of the attribute) as an input and generates an engagement score comprising a predicted probability of one or more customers performing a specific action with an item from the item category and having an attribute with the value. The weights comprise a set of parameters used by the engagement model to transform the input data—the item category of an item and a value of an attribute of the item-received by the engagement model into output data—the engagement score representing a probability of one or more customers performing the specific action with an item included in the item category and having the value for an attribute.

The online concierge system 140 generates the parameters (e.g., the weights) for the engagement model through training by applying 310 the engagement model to training examples generated 305 from prior interactions by one or more customers with the online concierge system 140, as further described above. After initializing the set of weights comprising the engagement model, the online concierge system 140 applies 310 the engagement model to multiple training examples of the training dataset. As further described above, each training example includes a combination of a training item category and a value of a training attribute of the item (and may include an identifier of the attribute of the item), with a label applied to a training example indicating a rate (or a frequency) with which one or more customers performed the specific action with one or more items of the training item category having the value of the training attribute. Applying 310 the engagement model to a training example generates a predicted probability of one or more customers performing the specific action with an item included in a training item category having the value of a training attribute included in the training example.

For each training example of the training dataset to which the engagement model is applied 310, the online concierge system 140 generates an error term based on a predicted probability of one or more customers performing the specific action with one or more items included in the training item category and having the value of the training attribute output by the engagement model and the label applied to the training example. The error term is larger when a difference between the predicted probability of one or more customers performing the specific action with one or more item included in the training item category and having the value of the training attribute and the label applied to the training example is larger and is smaller when the difference between the predicted probability of one or more customers performing the specific action with one or more item included in the training item category and having the value of the training attribute and the label applied to the training example is smaller. In various embodiments, the online concierge system 140 generates the error term between the predicted probability of one or more customers performing the specific action with one or more item included in the training item category and having the value of the training attribute output by the engagement model and the label applied to the training example using a loss function. Example loss functions include a mean square error function, a mean absolute error, a hinge loss function, and a cross-entropy loss function.

The online concierge system 140 backpropagates the error term to update the set of parameters comprising the engagement model and stops backpropagation in response to the error term, or the loss function, satisfying one or more criteria. For example, the online concierge system 140 backpropagates the error term through the engagement model to update parameters of the engagement model until the error term has less than a threshold value. For example, the online system 140 may apply gradient descent to update the set of parameters. The online concierge system 140 stores the set of parameters comprising the engagement model on a non-transitory computer readable storage medium after stopping the backpropagation.

Hence, the trained engagement model outputs an engagement score for a combination of an item category and a value of an attribute. The engagement score comprises a predicted probability of one or more customers performing the specific action with an item included in the item category and having the value of the attribute, so the engagement model provides a measure of influence the attribute has on the customer performing the specific action with an item. However, the training dataset used to train the engagement model may be noisy or biased based on actions by certain customers After storing the trained engagement model for the attribute selection model, the online concierge system 140 receives 315 a request from a customer to display an interface. For example, the request is a search query, with the interface search results including items satisfying the search query. As another example, the request from the customer is a selection of a category of items. As another example, the request from the customer is a request to display a recipe. In other embodiments, the request is a request to create an order for fulfillment.

Based on the request, the online concierge system 140 retrieves 320 a set of items for display in the requested interface. If the request is a search query, the online concierge system 140 retrieves 320 a set of items each having at least one attribute at least partially matching the search query. If the request identifies a recipe, the online concierge system 140 retrieves 320 a set of items included in the identified recipe. If the request identifies an item category, items in the item category comprise the retrieved set of items. If the request is for creating an order, the online concierge system 140 retrieves 320 a set of items offered by a retailer identified by the request. If the request includes other information, the online concierge system 140 retrieves 320 a set of items that each have at least one attribute matching (or partially matching) the information included in the request.

For each item of the retrieved set, the online concierge system 140 determines 325 an item category for an item. In various embodiments, the online concierge system 140 maintains associations between each item and an item category and determines 325 the item category associated with an item of the retrieved set. Based on the determined item category for an item, the online concierge system 140 selects 330 a group of attributes for the item category. For example, the group of attributes for the item category comprises attributes stored in association with at least one item in the determined item category. In some embodiments, the online concierge system 140 stores a group of attributes in association with an item category, and selects 330 the group of attributes associated with the determined item category. The group of attributes includes each attribute associated with at least one item in the determined item category in various embodiments.

For a determined item category of the retrieved set, the online concierge system 140 selects 335 a subset of attributes in the selected group by applying the attributed selection model to attributes of the group of attributes. In embodiments where the attribute selection model comprises the engagement model, the online concierge system 140 determines a score for each attribute in the selected group of attributes by applying the attribute selection model to each attribute in the selected group of attributes. To determine a score for an attribute, the online concierge system 140 identifies an attribute and applies the attribute selection model to the identified attribute. Application of the attribute selection model comprising the engagement model combinations of the determined item category and each value of the identified attribute, generates a set of engagement scores. The attribute selection model determines an engagement score for the identified attribute based on the set of engagement scores, as further described above. For example, the attribute selection model determines the engagement score for the identified attribute as a maximum engagement score of the set of engagement scores or as a difference between a maximum engagement score of the set of engagement scores and a minimum engagement score of the set of engagement scores.

The online concierge system 140 selects 335 the subset of attributes based on the determined engagement scores for each attribute of the group. In some embodiments, the online concierge system 140 selects an attribute of the group having a maximum engagement score. In other embodiments, the online concierge system 140 selects 335 a subset of attributes having at least a threshold engagement score. Alternatively, the online concierge system 140 ranks attributes of the group based on their corresponding engagement scores and selects 335 a subset of attributes having at least a threshold position in the ranking. Additionally, the number of attributes selected may be based on the engagement scores, such as by selecting within a range of number of attributes (e.g., 1-3 attributes), depending on how many attributes have corresponding engagement scores above a threshold.

In other embodiments, the attribute selection model comprises the large language model (LLM). In various embodiments, the LLM is a generative pre-trained transformer model (GPT). The online concierge system 140 generates a prompt for the LLM identifying the item category, descriptive information of each attribute included in the item category, and a request to select a specific number of attributes from the prompt relevant to a customer.

In various embodiments, the prompt for the LLM includes each attribute associated with an item category. For each attribute associated with an item category, the prompt includes an identifier of an attribute (e.g., a name of an attribute), a text description of the attribute, and a data type (e.g., string, Boolean, numeric) of the attribute. The prompt also includes a request to select a specific number of attributes for a set of attributes and one or more criteria for selecting the specific number of attributes. For example, the prompt includes information describing each attribute associated with an item category and a request to select ten attributes most relevant to customers including items in orders or performing another specific action with items. In various embodiments, the prompt includes one or more characteristics of a customer, tailoring selection of the set of attributes by the LLM to a specific customer. For example, characteristics of a customer included in a prompt includes one or more values of attributes of items that the online concierge system 140 determined the customer included in at least a threshold number of orders or included in orders with at least a threshold frequency. Including one or more characteristics of the customer based on previously fulfilled orders in the prompt allows the LLM to account for preferences of a particular customer when selecting attributes associated with the item category for inclusion in the set of attributes.

The online concierge system 140 selects 335 the subset of attributes as the attributes output by the LLM. For example, the prompt input to the LLM specifies a specific number of attributes, and the online concierge system selects 335 the subset of attributes of the group as the attributes output by the LLM in response to the prompt. When the attribute selection model comprises the LLM, the online concierge system 140 leverages the training of the LLM on larger text corpuses to select 335 the subset of attributes for the item category.

In some embodiments, the attribute selection model includes both the engagement model and the LLM. Augmenting the engagement model with the LLM in the attribute selection model mitigates potential noise or bias in the training dataset for the engagement model with the LLM previously trained on a text corpus to output text in response to a text prompt from a user. In such embodiments, the online concierge system 140 applies the attribute selection model to each attribute of the group, generating a score for each attribute of the group. The attribute selection model generates an engagement score for an attribute of the group by applying the engagement model to the combination of the item category and the attribute of the group, as further described above.

Additionally, the attribute selection model including the engagement model and the LLM generates a relevance score for an attribute based on an output of the LLM. As further described above, the online concierge system 140 generates a prompt for the LLM identifying an item category, descriptive information of each attribute included in the item category, and a request to select a specific number of attributes from the prompt relevant to a customer, as further described above. For an attribute of an item, the attribute selection model determines a score for the attribute by combining the engagement score from the engagement model and the relevance score based on the set of attributes output by the LLM. To determine the relevance score of an attribute, the attribute selection model compares the attribute to the set of attributes output by the LLM. In response to the attribute being included in the set of attributes output by the LLM, the attribute selection model assigns a specific value to a relevance score for the attribute, while the attribute selection model assigns an alternative value to the relevance score for the attribute in response to the attribute not being included in the set of attributes output by the LLM. The alternative value is less than the specific value in various embodiments. For example, a relevance score of an attribute included in the set of attributes output by the LLM is one, while the relevance score of an attribute that is not included in the set of attributes output by the LLM is zero. The attribute selection model combines an engagement score for an attribute from the engagement model with the relevance score for the attribute to generate the score for the attribute. For example, the score for an attribute is a sum of the engagement score for the attribute and the relevance score for the attribute. As another example, the attribute selection model applies weights to the engagement score and to the relevance score, with the score for an attribute comprising a weighted sum of the engagement score and the relevance score. Applying different weights to the engagement score and to the relevance score allows the attribute selection model to refine contributions to the score of an attribute by the engagement score and the relevance score.

When generating a score for an attribute, the attribute selection model including the engagement model and the LLM applies the engagement model to each value the attribute may have, generating a set of engagement scores that each correspond to a different value for the attribute. The attribute selection model determines the engagement score for the attribute based on the set of engagement scores. In various embodiments, the attribute selection model selects a maximum engagement score of the set of engagement scores as the engagement score for the attribute that is combined with the relevance score for the attribute. Alternatively, the attribute selection model derives an engagement score from the set of engagement scores and combines the derived engagement score with the relevance score for the attribute. For example, the attribute selection model determines an engagement score for an attribute as a difference between a maximum engagement score from the set of engagement scores for the attribute and a minimum engagement score from the set of engagement scores for the attribute. In other embodiments, the attribute selection model determines a derived engagement score for an attribute using another function applied to the set of engagement scores.

Based on the score determined for each attribute of the group, the online concierge system 140 selects 335 a subset of attributes for display in conjunction with an item included in the determined item category. For example, the online concierge system 140 ranks attributes of the group based on their corresponding scores so attributes with larger scores have higher positions in the ranking. The online concierge system 140 selects 335 attributes having at least a threshold position in the ranking as the subset of attributes for display in conjunction with the item. For example, the online concierge system 140 selects 335 an attribute having a highest position in the ranking for display or selects 335 a subset of attributes having at least a threshold position in the ranking for display. The online concierge system 140 may select 335 a different number of attributes in the subset in different embodiments. In some embodiments, the subset includes a single attribute, while in other embodiments the subset includes two attributes. However, any number of attributes may be included in the subset in various embodiments.

After selecting 335 the subset of attributes for the determined item category based on the scores for different combinations of the determined item category and attributes, the online concierge system 140 generates 340 the interface for display to the customer. In some embodiments, the online concierge system 140 generates the interface after selecting 340 the subset of attributes for each item category corresponding to at least one item to be displayed in the interface. For an item, the interface displays the subset of attributes selected for the item category including the item. In various embodiments, the interface displays a selected subset of attributes for a corresponding item category in conjunction with each item displayed by the interface. The interface may display text corresponding to each attribute included in a selected subset of attributes for an item category in conjunction with an item included in the item category in various embodiments. Alternatively, the interface displays an image, an icon, or other information corresponding to each attribute in the selected subset of attributes for an item category in conjunction with an item included in the item category. This allows the interface to display one or more attributes of an item in conjunction with the item based on a corresponding item category including the item. As further described above, the subset of items for display for an item category is selected 335 to include attributes most likely to influence the customer's interaction with an item included in the item category. For example, attributes displayed in conjunction with item are attributes most likely to affect whether the customer includes an item in an order, based on historical inclusion of items in a common item category in orders by the customer (or by various customers).

Figure 4:
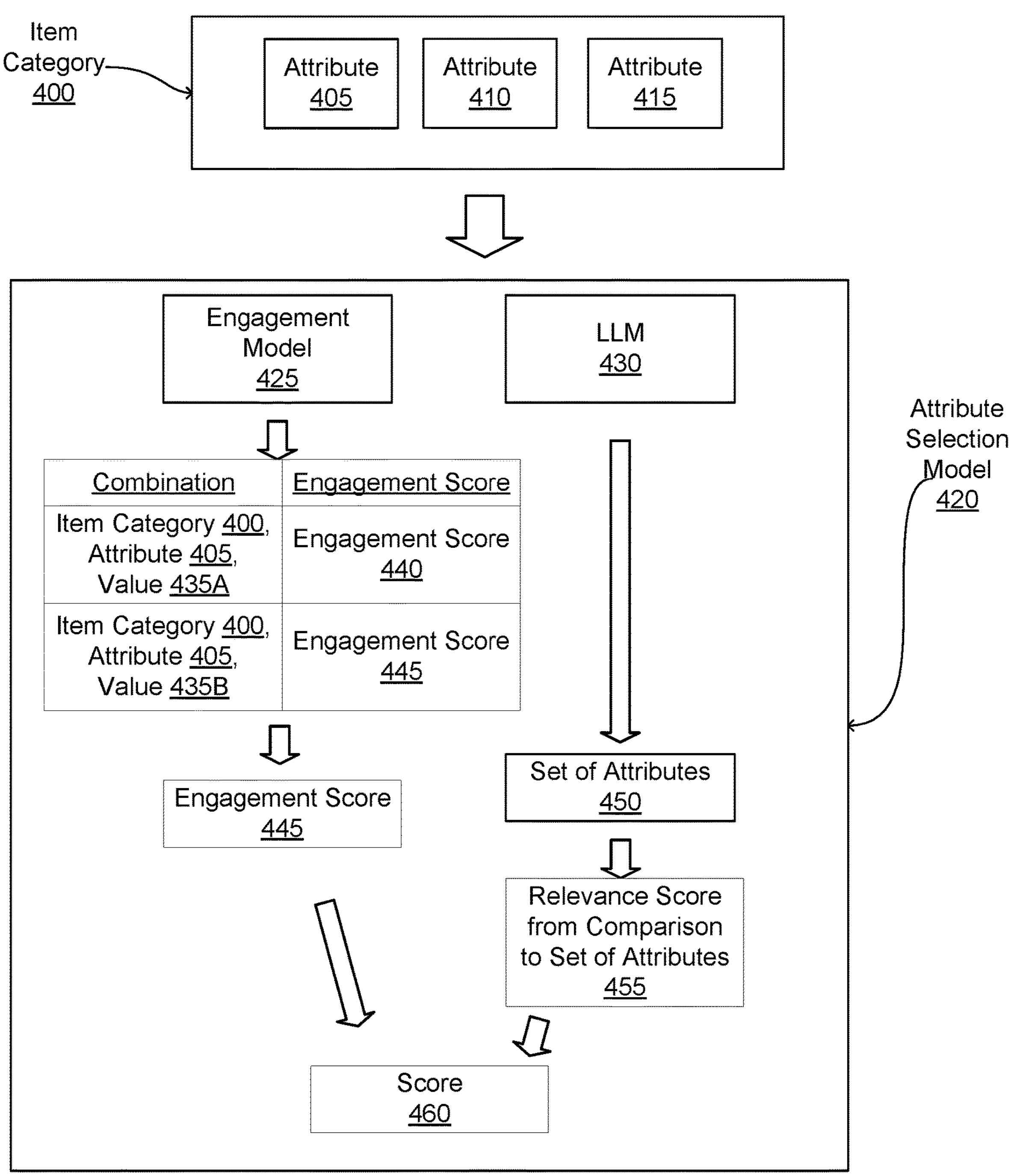
FIG. 4 is a process flow diagram of a method for selecting an attribute of an item for display in an interface presented to a customer of an online concierge system, in accordance with one or more embodiments.

FIG. 4 is a process flow diagram of a method for selecting an attribute of an item for display in an interface presented to a customer of an online concierge system 140. In the example of FIG. 4, the online concierge system 140 identifies an item category 400 and selects attribute 405, attribute 410, and attribute 415 as a group of attributes for item category 400. In various embodiments, attribute 405, attribute 410, and attribute 415 are each attributes associated with at least one item included in item category 400. In various embodiments, the group of attributes includes all attributes associated with at least one item in item category 400. In various embodiments, item category 400 includes an item to be displayed in an interface to be generated by the online concierge system 140. For example, item category 400 includes an item included in search results for display to a customer or includes an item offered by a retailer identified by the customer in a request to create an order.

As further described above in conjunction with FIG. 3, an interface displaying items to a customer has limited display space for displaying different items. To simplify review and evaluation of items through the interface, the online concierge system 140 displays one or more attributes of an item in conjunction with the item in the interface. However, each item is associated with multiple attributes, and the interface has a limited display area for different items. Because of the limited display area for an item, displaying a large number of attributes in conjunction with the item makes the interface more cumbersome and more difficult to navigate for customers. This increased complexity of navigating the interface reduces a likelihood of the customer performing a specific action via the interface (e.g., including an item in an order). While limiting a number of attributes displayed in conjunction with an item simplifies navigation of the interface by customers to account for limited display area for items, different attributes of an item may differently influence performance of a specific action with the item by the customer (e.g., including the item in an order). Hence, displaying a limited number of attributes in conjunction with an item may prevent a customer from readily identifying an attribute of the item influencing whether the customer performs the specific action with the item. To optimize display of one or more attributes of an item in a limited display area of an interface, the online concierge system 140 applies an attribute selection model 420 to a group of attributes associated with item category 400 of the item to be displayed. In the example of FIG. 4, attribute 405, attribute 410, and attribute 415 comprise the group of attributes for item category 400.

Based on application of the attribute selection model 420 to the group of attributes for item category 400, the online concierge system 140 selects a subset of the group of attributes for display in conjunction with an item included in item category 400. To select the subset of attributes for item category 400, the online concierge system 140 applies the attribute selection model 420 to each attribute of the group of attributes. Hence, in the example of FIG. 4, the online concierge system 140 applies the attribute selection model 420 to each of attribute 405, attribute 410, and attribute 415.

As further described above in conjunction with FIGS. 2 and 3, the attribute selection model 420 may comprise an engagement model 425, a large language model (LLM), or a combination of the engagement model 425 and the LLM 430. For purposes of illustration, FIG. 4 shows an example attribute selection model 420 including both the engagement model 425 and the LLM 430. Embodiments where the attribute selection model 425 comprises the engagement model 425 are further described above in conjunction with FIG. 3. Similarly, embodiments where the attribute selection model 425 comprises the LLM 430 are further described above in conjunction with FIG. 3.

The engagement model 425 is trained from prior interactions by a customer, or by one or more customers, with the online concierge system 140. For example, the engagement module 425 is trained based on a rate (or a frequency) with which a customer (or multiple customers) performs a specific action with one or more items in an item category and having a value for an attribute (e.g., a frequency with which one or more customers include one or more items included in an item category and having a value for an attribute in one or more orders). A training dataset for the engagement model 425 may be determined based on interactions by a particular customer with the online concierge system 140, so the online concierge system 140 trains the engagement model 425 for the particular customer, or may be determined based on interactions by multiple customers with the online concierge system 140 to training the engagement model 425 for application to various customers of the online concierge system 140. In various embodiments, the online concierge system 140 trains the engagement module 425 through backpropagation based on application to multiple training examples, with each training example including a combination of a training item category and a value for a training attribute and having a label applied indicating a rate with which one or more customers performed the specific action with an item from the training item category having the value for the training attribute. Training of the engagement model 425 is further described above in conjunction with FIG. 3.

For purposes of illustration, FIG. 4 shows an example where the attribute selection model 420 is applied to attribute 405. In the example of FIG. 4, the engagement model 425 receives a combination of item attribute 405, an identifier of attribute 405 (e.g., a name of attribute 405), and a value of attribute 405; however, in other embodiments, the engagement model 425 receives a combination of item category 400 and a value of attribute 405. While FIG. 4 shows an example where attribute 405 has two potential values, value 435A and value 425B, in other embodiments, attribute 405 may have any number of potential values. When applied to attribute 405, the attribute selection module 420 applies the engagement model 425 to each combination of item category 400 and value attribute 405 may have, resulting in a set of engagement scores each corresponding to different combinations of item category 400 and values for attribute 405. In the example of FIG. 4, the set of engagement scores includes engagement score 440 for a combination of item category 400, attribute 405, and value 435B for attribute 405 and engagement score 445 for a combination of item category 400, attribute 405, and value 435B for attribute 405. As further described above in conjunction with FIG. 3, the engagement model 425 determines an engagement score for the combination of item category 400 and attribute 405 based on the set of engagement scores for different values of attribute 405. In the example of FIG. 4, the engagement model 425 determines the engagement score for the combination of item category 400 and attribute 405 as a maximum engagement score from the set of engagement scores, which is engagement score 445 in the example of FIG. 4. In other embodiments, the engagement model 425 determines the engagement score for the combination of item category 400 and attribute 405 based on multiple engagement scores for different combinations of item category 400 and values for attribute 405. For example, the engagement model 425 determines the engagement score for the combination of item category 400 and attribute 405 as a difference between a maximum engagement score and a minimum engagement score in the set of engagement scores.

While the engagement score for a combination of item category 400 and an attribute provides an indication of how the attribute influences a customer in performing a specific action with items included in item category 400 (e.g., including an item in an order), data used to train the engagement model 425 may be noisy or be biased based on actions by certain customers, decreasing an accuracy of the resulting engagement scores in describing customer behavior. To mitigate noise or bias influencing the engagement model 425, the attribute selection model 420 augments the engagement model 425 using an output from a large language model (LLM) 430. The LLM 430 was previously trained on a text corpus to output text in response to a text prompt from a user. In various embodiments, the LLM 430 is a generative pre-trained transformer model (GPT). When applying the attribute selection model 420 to a combination of item category 400 and attribute 405, the online concierge system 140 generates a prompt for the LLM 430 identifying item category 515, descriptive information of each attribute associated with item category 515 (i.e., descriptive information of each attribute included in the group of attributes associated with item category 515), and a request to select a specific number of attributes from the prompt relevant to a customer (or satisfying one or more other criteria included in the prompt). As further described above in conjunction with FIG. 3, the prompt received by the LLM 430 may include an identifier of each attribute of the group of attributes associated with item category 400, a text description of each attribute of the group of attributes (e.g., attribute 405, attribute 410, attribute 415) associated with item category 400, a data type of each attribute of the group of attributes associated with item category 400, a request to select a specific number of attributes and one or more criteria for selecting the specific number of attributes. In some embodiments, the prompt also includes one or more characteristics of a customer to tailor selection of the attributes by the LLM 430 to a specific customer. Example characteristics of a customer include one or more values for attributes of items previously included in orders by the specific customer, such as values for attributes of items included in orders by the specific customer with at least a threshold frequency or included in at least a threshold number of orders.

Based on the received prompt, the LLM 430 outputs a set of attributes 450 for the item category 400. The set of attributes 450 includes a specific number of attributes selected from the group of attributes associated with item category 400 by the LLM 430 based on a received prompt. In various embodiments, the set of attributes 450 includes fewer attributes than the group of attributes associated with item category 400. A specific number included in the prompt determines a number of attributes included in the set of attributes in various embodiments.

When applied to an attribute, the attribute selection model 420 generates a relevance score 455 for the attribute by comparing the attribute to the set of attributes generated by the LLM 430. In various embodiments, the relevance score 455 has a particular value when the attribute is included in the set of attributes 450 and has an alternative value when the attribute is not included in the set of attributes 450. The alternative value is less than the particular value in various embodiments. For example, the relevance score 455 of attribute 405 has a value of one in response to attribute 440 being included in the set of attributes 450, but has a value of zero in response to attribute 405 not being included in the set of attributes 450.

The attribute selection module 420 determines score 460 for attribute 405 by combining the relevance score 455 for attribute 405 and the engagement score (engagement score 445) determined by the engagement model 425 for the combination of item category 400 and attribute 405. For example, score 460 for attribute 405 in FIG. 4 is a sum of relevance score 455 for attribute 405 and engagement score 445 for the combination of attribute 405 and item category 400. In other embodiments, the attribute selection model 420 applies weights to relevance score 455 and to engagement score 445, with the score 460 for attribute 405 determined as the weighted sum of relevance score 455 and engagement score 445. However, in other embodiments, the score 460 is determined based on one or more other functions including relevance score 455 and engagement score 445 for attribute 405. The online concierge system 140 applies the attribute selection model 420 to each of attribute 405, attribute 410, and attribute 415, generating a corresponding score for each of attribute 405, attribute 410, and attribute 415. Based on the scores from the attribute selection model 420 for each of attribute 405, attribute 410, and attribute 415, the online concierge system 140 selects a subset of attribute 405, attribute 410, and attribute 415 for item category 400. For example, the online concierge system 140 ranks attribute 405, attribute 410, and attribute 415 based on their corresponding scores and selects attributes having at least a threshold position in the ranking as the subset. Subsequently, when an interface displays an item included in item category 400, the online concierge system 140 displays the attributes included in the subset selected for item category 400 in conjunction with the item. This allows the interface to display specific attributes in conjunction with an item that the online concierge system 140 determined to have maximum influence on the customer performing a specific action with items in a common item category as the item.

Figure 5:
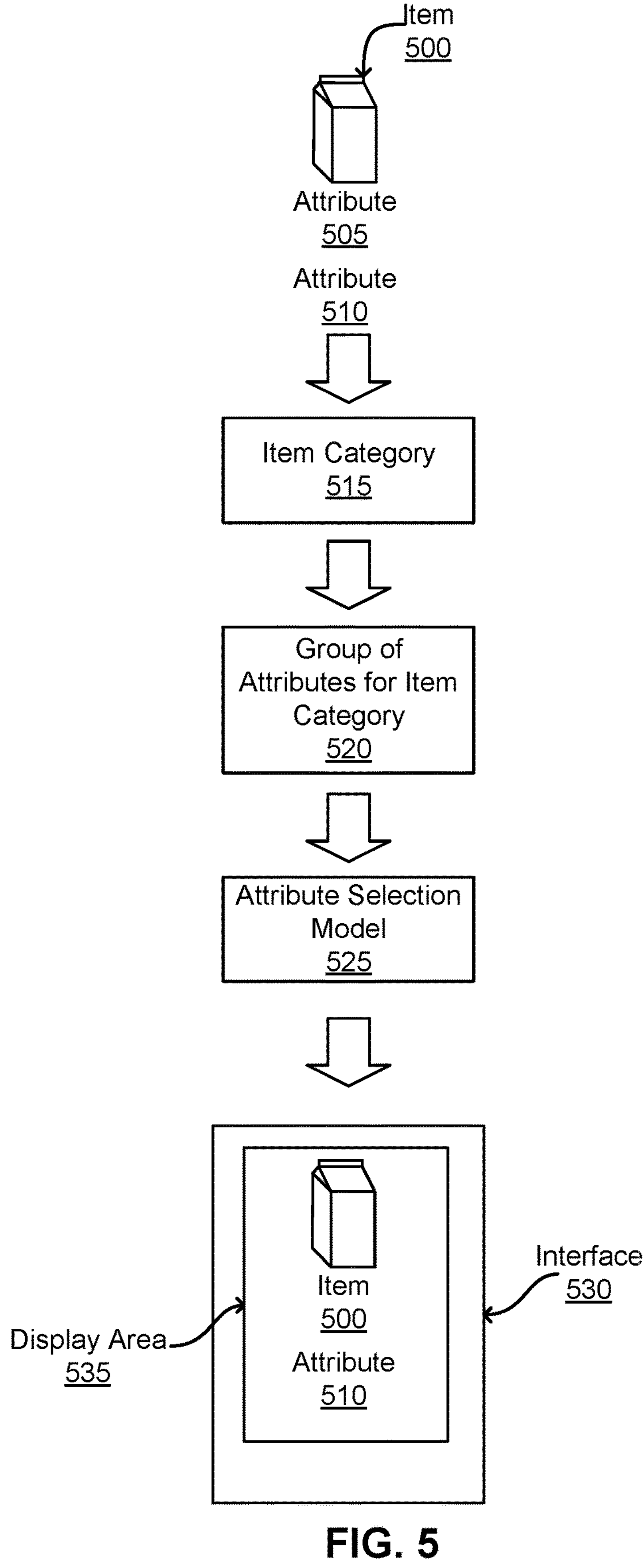
FIG. 5 is an example process flow diagram of a method for generating an interface for displaying an item and a selected attribute of the item, in accordance with one or more embodiments.

FIG. 5 is a process flow diagram of a method for generating an interface for displaying an item and a selected attribute of the item. For purposes of illustration, FIG. 5 shows an item 500 and attribute 505 and attribute 510 of the item 500. In the example of FIG. 5, item 500 is to be displayed in one or more interfaces by the online concierge system 140. However, various interfaces displayed by the online concierge system 140 have limited display area allocated for displaying information about. While displaying attributes of the item 500 in conjunction with the item 500 in an interface simplifies customers, having limited display area for information about items increases complexity of a customer navigating the interface by increasing an amount of information included in the interface. Additionally, displaying a large number of attributes the item 500 in an interface increases a difficulty of the customer reviewing attributes of the item 500 to evaluate whether to include the item 500 in an order or to perform another action with the item 500. Further, different customers differently emphasize different attributes of items, so limiting display of attributes of the item 500 in an interface may prevent a customer from easily determining whether to perform a specific action with the item 500 based on displayed attributes of the item 500 in an interface by withholding display of one or more attributes of the item 500 most likely to influence the customer's actions.

To optimize information about an item in a display area of an interface for the item 500, the online concierge system 140 determines an item category 515 of the item 500, as further described above in conjunction with FIGS. 3 and 4. Based on the item category 515 of the item 500, the online concierge system 140 selects a group 520 of attributes corresponding to the item category 515, as further described above in conjunction with FIGS. 3 and 4. By applying a trained attribute selection model 525 to each attribute of the group 520, the online concierge system 140 selects a subset of the attributes for display in conjunction with the item 500 in an interface 530. As further described above in conjunction with FIGS. 3, the attribute selection model 525 may be an engagement model that generates a score for each attribute of the group 520 based on a predicted probability of a user performing a specific action when the item 500 when an attribute is displayed in conjunction with the item 500, and the online concierge system 140 selects a subset of attributes of the group 520 based on the scores. In other embodiments, as further described above in conjunction with FIG. 3, the attribute selection model 320 is a large language model that receives a prompt including descriptions of attributes of the group 520 and one or more criteria for selecting a specific number of attributes, with the specific number of attributes output by the large language model comprising the subset of attributes selected by the attribute selection model 525. Alternatively, the attribute selection model 525 generates scores for each attribute of the group 520 using a combination of an engagement model and a large language model, as further described above in conjunction with FIGS. 3 and 4, with the online concierge system 140 selecting a subset of attributes based on the score.

After selecting the subset of attributes, the online concierge system 140 generates an interface 530 that displays the item 500 and displays the subset of attributes in conjunction with the item 500. As shown in the example of FIG. 5, the interface 530 allocates a display area 535 for displaying information about the item 500. In various embodiments, the display area 535 has a specific width and a specific height, limiting an area in which information about the item 500 is displayed. Because of the limited area for displaying information in the display area 535, displaying a large number of attributes of the item 500 provides excessive information about the item and makes the interface 530 more cumbersome and more difficult to navigate. Selecting a subset of attributes of the item 500 for display based on the attribute selection model 525 allows the online concierge system 140 to optimize the information displayed in the limited area available in the display area 535 of the interface for the item 500. Selecting the subset of attributes of the item 500 based on the attribute selection model 525 allows the interface to display one or more specific attributes in conjunction with the item 500 determined to have maximum influence on the customer performing a specific action with items in a common item category as the item. For purposes of illustration, FIG. 5 shows an example where the online concierge system 140 selects a single attribute of the item 500, attribute 510 in FIG. 5, for display in the interface 530 to optimally include information about the item 500 in the display area 535 for the item 500.

Additional Considerations

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable storage medium, comprising:

receiving a request from a user device to display an interface, the interface including an item along with a plurality of additional items;

in response to the request, retrieving the items for display in the interface;

identifying an item category for the item;

selecting a group of attributes corresponding to the identified item category;

selecting, based on application of an attribute selection model to the group of attributes, a subset of attributes from the group, by:

generating a score for each of the group of attributes by applying the attribute selection model to each of the group of attributes, the attribute selection model comprising an engagement model generating an engagement score for an attribute of the group, the engagement model trained by:

obtaining a training dataset including a plurality of training examples, each training example including a combination of a training item category and a value for a training attribute of an item in the training item category, each training example having a label indicating a rate at which one or more users performed a specific action with one or more items of the training item category having the value for the training attribute;

applying the engagement model to each training example of the training dataset to generate a predicted probability of the user performing the specific action with one or more items of the training item category having the value for the training attribute;

scoring the engagement model using a loss function and the label of the training example; and updating one or more parameters of the engagement model by backpropagation based on the scoring until one or more criteria are satisfied; and selecting, based on the generated scores, the subset of attributes from the group of attributes;

generating the interface for display to the user, the interface displaying the item and, in conjunction with the item, the selected subset of attributes for the item category of the item; and sending the generated interface to the user device, wherein sending the generated interface to the user device causes the user device to display the generated interface.

2. The method of claim 1, wherein selecting, based on application of an attribute selection model to the group of attributes, the subset of attributes from the group further comprises:

inputting a prompt to a large language model, the prompt including the item category, an identifier of each attribute of the group, a description of each attribute of the group, and a request to select a specific number of attributes from the group of attributes; and including the attributes output by the large language model in the subset of attributes from the group.

3. The method of claim 2, wherein inputting the description of an attribute of the group comprises inputting a text description of the attribute of the group and a data type of the attribute of the group.

4. The method of claim 3, wherein inputting the prompt further comprises inputting one or more characteristics of the user.

5. The method of claim 4, wherein inputting the one or more characteristics of the user comprises inputting one or more values of attributes of items the user included in orders fulfilled by the computer system with at least a threshold frequency.

6. The method of claim 1, wherein selecting, based on application of an attribute selection model to the group of attributes, the subset of attributes from the group comprises:

generating a score for each attribute of the group by applying the attribute selection model to an attribute of the group, the attribute selection model generating the score based on a relevance score for the attribute of the group based on a large language model and an engagement score from an engagement model for the attribute of the group, the engagement model trained by:

obtaining a training dataset including a plurality training examples, each training example including a combination of a training item category and a value for a training attribute of an item in the training item category, each score training example having a label indicating a rate at which one or more users performed a specific action with one or more items of the training item category having the value for the training attribute;

applying the engagement model to each training example of the training dataset to generate a predicted probability of the user performing the specific action with one or more items of the training item category having the value for the training attribute;

scoring the engagement model using a loss function and the label of the training example; and updating one or more parameters of the engagement model by backpropagation based on the scoring until one or more criteria are satisfied; and selecting the subset of attributes of the group based on the scores.

7. The method of claim 6, wherein generating the score for each attribute of the group by applying the attribute selection model to the attribute of the group comprises:

generating a set of engagement scores for the attribute of the group, each engagement score corresponding to a different value for the attribute;

selecting an engagement score from the set of engagement scores; and generating the score for the attribute of the group by combining the selected engagement score for the attribute of the group with the relevance score for the attribute of the group.

8. The method of claim 6, wherein the relevance score for the attribute of the group based on the large language model has a particular value in response to the attribute of the group being included in a set of attributes output by the large language model in response to a prompt including the item category and has an alternative value in response to the attribute of the group being included in a set of attributes output by the large language model in response to the prompt including the item category.

9. The method of claim 8, wherein generating the score for the attribute of the group by combining the selected engagement score for the attribute of the group with the relevance score for the attribute of the group comprises:

adding the selected engagement score for the attribute of the group with the relevance score for the attribute of the group.

10. A computer program product comprising a non-transitory computer readable medium having instructions encoded thereon that, when executed by a processor, cause the processor to perform steps comprising:

receiving a request from a user device to display an interface, the interface including an item along with a plurality of additional items;

in response to the request, retrieving the items for display in the interface;

identifying an item category for the item;

selecting a group of attributes corresponding to the identified item category;

selecting, based on application of an attribute selection model to the group of attributes, a subset of attributes from the group, by:

generating a score for each of the group of attributes by applying the attribute selection model to each of the group of attributes, the attribute selection model comprising an engagement model generating an engagement score for an attribute of the group, the engagement model trained by:

obtaining a training dataset including a plurality of training examples, each training example including a combination of a training item category and a value for a training attribute of an item in the training item category, each training example having a label indicating a rate at which one or more users performed a specific action with one or more items of the training item category having the value for the training attribute;

applying the engagement model to each training example of the training dataset to generate a predicted probability of the user performing the specific action with one or more items of the training item category having the value for the training attribute;

scoring the engagement model using a loss function and the label of the training example; and updating one or more parameters of the engagement model by backpropagation based on the scoring until one or more criteria are satisfied; and selecting, based on the generated scores, the subset of attributes from the group of attributes;

generating the interface for display to the user, the interface displaying the item and, in conjunction with the item, the selected subset of attributes for the item category of the item; and sending the generated interface to the user device, wherein sending the generated interface to the user device causes the user device to display the generated interface.

11. The computer program product of claim 10, wherein selecting, based on application of an attribute selection model to the group of attributes, the subset of attributes from the group further comprises:

inputting a prompt to a large language model, the prompt including the item category, an identifier of each attribute of the group, a description of each attribute of the group, and a request to select a specific number of attributes from the group of attributes; and including the attributes output by the large language model in the subset of attributes from the group.

12. The computer program product of claim 11, wherein inputting the description of an attribute of the group comprises inputting a text description of the attribute of the group and a data type of the attribute of the group.

13. The computer program product of claim 12, wherein inputting the prompt further comprises inputting one or more characteristics of the user.

14. The computer program product of claim 13, wherein inputting the one or more characteristics of the user comprises inputting one or more values of attributes of items the user included in orders fulfilled by a computer system with at least a threshold frequency.

15. The computer program product of claim 10, wherein selecting, based on application of an attribute selection model to the group of attributes, the subset of attributes from the group comprises:

generating a score for each attribute of the group by applying the attribute selection model to an attribute of the group, the attribute selection model generating the score based on a relevance score for the attribute of the group based on a large language model and an engagement score from an engagement model for the attribute of the group, the engagement model trained by:

obtaining a training dataset including a plurality training examples, each training example including a combination of a training item category and a value for a training attribute of an item in the training item category, each score training example having a label indicating a rate at which one or more users performed a specific action with one or more items of the training item category having the value for the training attribute;

applying the engagement model to each training example of the training dataset to generate a predicted probability of the user performing the specific action with one or more items of the training item category having the value for the training attribute;

scoring the engagement model using a loss function and the label of the training example; and updating one or more parameters of the engagement model by backpropagation based on the scoring until one or more criteria are satisfied; and selecting the subset of attributes of the group based on the scores.

16. The computer program product of claim 15, wherein determining the score for each attribute of the group by applying the attribute selection model to the attribute of the group comprises:

generating a set of engagement scores for the attribute of the group, each engagement score corresponding to a different value for the attribute;

selecting an engagement score from the set of engagement scores; and generating the score for the attribute of the group by combining the selected engagement score for the attribute of the group with the relevance score for the attribute of the group.

17. The computer program product of claim 15, wherein the relevance score for the attribute of the group based on the large language model has a particular value in response to the attribute of the group being included in a set of attributes output by the large language model in response to a prompt including the item category and has an alternative value in response to the attribute of the group being included in a set of attributes output by the large language model in response to the prompt including the item category.

18. A system comprising:

a processor; and a non-transitory computer readable storage medium having instructions encoded thereon that, when executed by the processor, cause the processor to perform steps comprising:

receiving a request from a user device to display an interface, the interface including an item along with a plurality of additional items;

in response to the request, retrieving the items for display in the interface;

identifying an item category for the item;

selecting a group of attributes corresponding to the identified item category;

selecting, based on application of an attribute selection model to the group of attributes, a subset of attributes from the group, by:

generating a score for each of the group of attributes by applying the attribute selection model to each of the group of attributes, the attribute selection model comprising an engagement model generating an engagement score for an attribute of the group, the engagement model trained by:

obtaining a training dataset including a plurality of training examples, each training example including a combination of a training item category and a value for a training attribute of an item in the training item category, each training example having a label indicating a rate at which one or more users performed a specific action with one or more items of the training item category having the value for the training attribute;

applying the engagement model to each training example of the training dataset to generate a predicted probability of the user performing the specific action with one or more items of the training item category having the value for the training attribute;

scoring the engagement model using a loss function and the label of the training example; and updating one or more parameters of the engagement model by backpropagation based on the scoring until one or more criteria are satisfied; and selecting, based on the generated scores, the subset of attributes from the group of attributes;

generating the interface for display to the user, the interface displaying the item and, in conjunction with the item, the selected subset of attributes for the item category of the item; and sending the generated interface to the user device, wherein sending the generated interface to the user device causes the user device to display the generated interface.

19. The system of claim 18, wherein selecting, based on application of an attribute selection model to the group of attributes, the subset of attributes from the group further comprises:

inputting a prompt to a large language model, the prompt including the item category, an identifier of each attribute of the group, a description of each attribute of the group, and a request to select a specific number of attributes from the group of attributes; and including the attributes output by the large language model in the subset of attributes from the group.

* * * * *